United States Patent [19]
Krummer et al.

[11] Patent Number: 6,106,140
[45] Date of Patent: Aug. 22, 2000

[54] LIGHTING ARRANGEMENT FOR FREIGHT COMPARTMENTS

[75] Inventors: Thomas Krummer, Weissenburg; Otmar Kruppa, Deiningen, both of Germany

[73] Assignee: Diehl Stiftung & Co., Nürnberg, Germany

[21] Appl. No.: 09/240,258

[22] Filed: Jan. 29, 1999

[30] Foreign Application Priority Data

Feb. 20, 1998 [DE] Germany .......................... 198 07 348

[51] Int. Cl.$^7$ .......................... F21W 101/06; F21V 8/00
[52] U.S. Cl. .......................... 362/471; 362/511; 362/543
[58] Field of Search .................................. 362/511, 543, 362/544, 470, 471, 479, 485, 576, 559

[56] References Cited

U.S. PATENT DOCUMENTS

| | | | |
|---|---|---|---|
| 4,152,752 | 5/1979 | Niemi | 362/576 |
| 5,483,427 | 1/1996 | Dealey et al. | 362/485 |
| 5,647,658 | 7/1997 | Ziadi | 362/471 |
| 5,651,733 | 7/1997 | Schumacher | 362/471 X |
| 5,677,603 | 10/1997 | Speirs et al. | 362/471 X |
| 5,678,914 | 10/1997 | Dealey et al. | 362/485 X |
| 5,752,760 | 5/1998 | Dealey, Jr. et al. | 362/479 X |
| 5,873,644 | 2/1999 | Roessner et al. | 362/470 X |

FOREIGN PATENT DOCUMENTS

| | | |
|---|---|---|
| 795 468 A2 | 9/1997 | European Pat. Off. . |
| 34 34 536 A1 | 3/1986 | Germany . |
| 6298003 | 10/1994 | Japan .......................... 362/479 |
| 2261061 | 5/1993 | United Kingdom .......................... 362/576 |

*Primary Examiner*—Laura K. Tso
*Attorney, Agent, or Firm*—Scully, Scott, Murphy & Presser

[57] ABSTRACT

A lighting arrangement for a space or compartment (2) which can be closed off, with a fire-proofing ceiling (3), in particular for receiving freight in passenger aircraft, comprising lighting units (6) arranged in the fire-proofing ceiling (3), which for the purposes of static load relief of the fire-proofing ceiling (3) and at the same time for a better lighting effect for the space or compartment (2), has the following features: a plurality of through openings (19) are arranged in distributed fashion in the fire-proofing ceiling (3), fire-resistant light coupling-out elements (16) are arranged in the through openings (19) in such a way that their light cones (9) intersect in the space or compartment (2) and the light coupling-out elements (16) are connected by way of optical waveguides (14) to at least one common light source (15).

5 Claims, 2 Drawing Sheets

6,106,140

LIGHTING ARRANGEMENT FOR FREIGHT COMPARTMENTS

BACKGROUND OF THE INVENTION

1. Field of the Invention

The invention concerns a lighting arrangement for a room or space which can be closed off, having a fire-proofing ceiling, in particular for a freight compartment of passenger aircraft, and which provides for lighting units arranged in fire-proofing ceiling.

In passenger aircraft the freight compartment or compartments is or are generally disposed beneath the passenger compartment, in which case the floor surface of the passenger compartment substantially simultaneously represents the ceiling of the freight compartment. Reference is made to FIGS. 3 and 4 showing by way of example the principle of a conventional lighting system for such freight compartments.

2. Discussion of the Prior Art

The freight compartment 2 of the passenger aircraft, which is arranged beneath the passenger compartment 1, is defined by the ceiling 3, the floor 4 and the side walls 5. Provided in the ceiling 3 of the freight compartment 2 are one or more lighting units 6 which only partially illuminate the freight compartment 2 in the manner indicated by the light cone 9. As can be seen from the portion of the arrangement shown on an enlarged scale in FIG. 4, the lighting unit 6 has in general one or two fluorescent lamps 7 with corresponding electronics 8. The fluorescent lamps 7 are disposed in a fire-resistant housing, for example a high-quality steel light housing 10 which has a plug housing 11 for the electrical connections of the light electronics 8. The high-quality steel housing 10 is closed at its side that faces towards the floor 2 by a translucent cover 12. The cover is generally arranged in the plane of the freight compartment ceiling 3 so that the lighting unit 6 is disposed above the freight compartment 2 and extends into the passenger compartment 1. The lighting unit 6 is secured to the freight compartment ceiling 3 by suitable fixing devices 13.

An essential component in that structure which is shown in FIGS. 3 and 4 is the freight compartment ceiling 3 which is necessarily in the form of a fire-proofing wall between the freight compartment 2 and the passenger compartment 1. That fire-proofing wall may also not be interrupted by the lighting units 6, for safety reasons. Therefore, with those conventional lighting systems, it is necessary for the lighting unit itself, that is to say in particular the housing 10, the cover 12 and the fixing devices 13, also to be in the form of a fire wall structure. Added to that is the fact that, with these relatively large lighting units 6 which generally involve a dimension between the fixing devices 13 at both sides of the lighting unit 6 of about 20 cm, a relatively large passage opening 19 has to be provided in the freight compartment ceiling 3 to fit the unit therethrough, whereby the floor load-carrying capability of the passenger compartment 1 is noticeably restricted.

In addition for example EP-A2-0 795 468 discloses a lighting system for passenger cabins of passenger aircraft. The lighting arrangement disclosed in that publication affords a unitary system which ensures minimum weight and a high level of reliability by virtue of the arrangement in the passenger cabin of optical waveguides which start from at least one central light source and which are connected to the most widely varying lighting units in the passenger cabin. In contrast to the above-discussed situation of lighting the freight compartment however, illumination of the passenger cabin does not involve the problems of limited floor load-bearing capability and designing the lighting units in the form of fire-proofing elements.

SUMMARY OF THE INVENTION

Taking the above-indicated state of the art as its basic starting point, an object of the present invention is to improve the known lighting arrangement for a closable space or compartment with a fire-proofing ceiling, in particular for a freight compartment of a passenger aircraft, in such a way that the fire-proofing ceiling can be closed in a fire-proof/flame-resistant manner, it enjoys static load relief and at the same time illumination of the space or compartment is improved.

The structure according to the invention makes it possible for the through openings for the light coupling-out elements to be small, in comparison with the previous design configurations, whereby the static load-bearing capability of the fire-proofing ceiling is increased. In addition the use of the optical waveguide or glass fibre technology already in itself offers an increased level of fire-resistance. A further advantage is that the use of a plurality of lighting units, the light cones of which intersect in the freight compartment, provides for better illumination of the entire freight compartment and the required level of brightness is immediately available by virtue of using glass fibre technology. The structure according to the invention also affords advantages in terms of weight, installation and maintenance in comparison with the conventional lighting systems.

It is particularly advantageous for a fire or smoke detector to be at least partially integrated into the lighting elements in order to enhance the level of safety in the freight compartment or in the aircraft.

BRIEF DESCRIPTION OF THE DRAWINGS

The invention is described in greater detail hereinafter by means of a preferred embodiment with reference to the accompanying drawing in which.

DETAILED DESCRIPTION OF PREFERRED EMBODIMENTS

Figure 1:
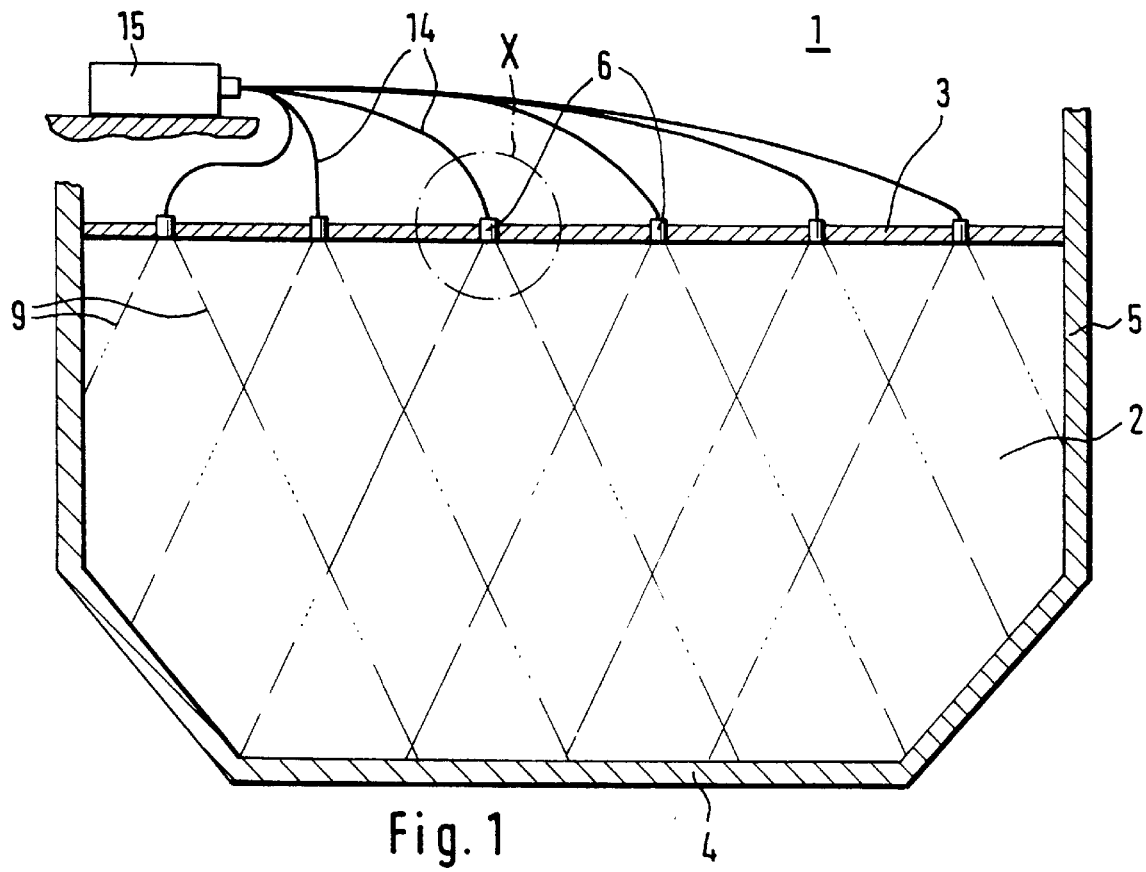
FIG. 1 is a sectional view in principle of a freight compartment with a lighting arrangement according to the invention.
Figure 2:
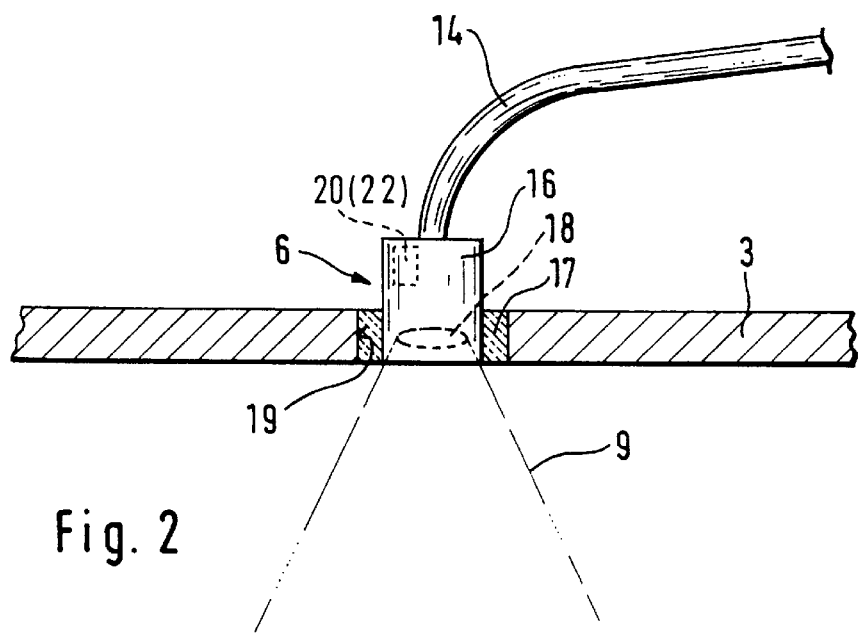
FIG. 2 shows the portion indicated at X in FIG. 1 of a lighting unit according to the invention on an enlarged scale.

Referring to FIGS. 1 and 2, shown therein is a preferred embodiment of a lighting arrangement for a freight compartment of a passenger aircraft. In that respect, the same components are denoted by the same references as in the case of the conventional freight compartment lighting system shown in FIGS. 3 and 4.

The freight compartment 2, which is arranged beneath the passenger compartment 1, of the passenger aircraft is defined by the ceiling 3, the floor 4 and the side walls 5, while the freight compartment ceiling 3 substantially simultaneously forms the floor surface of the passenger compartment 1 and must be in the form of a fire-proofing wall. Provided in a distributed array in grid-like configuration in the freight compartment ceiling 3 is a plurality of through openings 19, into each of which is fitted a respective fire-resistant lighting unit 6. The through openings 19 are preferably arranged in an equally distributed fashion, in particular in a matrix configuration, on the freight compartment ceiling 3. The distribution in accordance with the invention of the lighting units 6 ensures a uniform illumination effect. Furthermore it is readily possible, with the distribution of the lighting units 6, to distribute the lighting system brightness in a specifically controlled and directed manner and completely avoid dark corners and regions.

The lighting units 6 are each respectively connected by way of an optical waveguide or an optical glass fibre bundle 14 to a common light source 15 disposed in a light distribution housing. Instead of the one common light source 15 it is also possible if necessary to provide a plurality of light sources, in a small number thereof, which are each connected by way of optical waveguides 14 to a plurality of lighting units 6.

Optical waveguide systems with central light sources are generally known from a practical context. The light of the central light source 15 is fed into the optical waveguides 14 by means of optical systems in the light distribution housing. The light source 15 can be a commercially available incandescent lamp, a halogen vapour lamp, an inert-gas lamp, a metal vapour lamp, a laser or another commercially available lamp. The light thereof is introduced either simultaneously or in rapid succesion into the optical waveguides 14. Such a known optical waveguide system is disclosed for example in DE-A1-34 34 536 or EP-A2-0 795 468.

Figure 3:
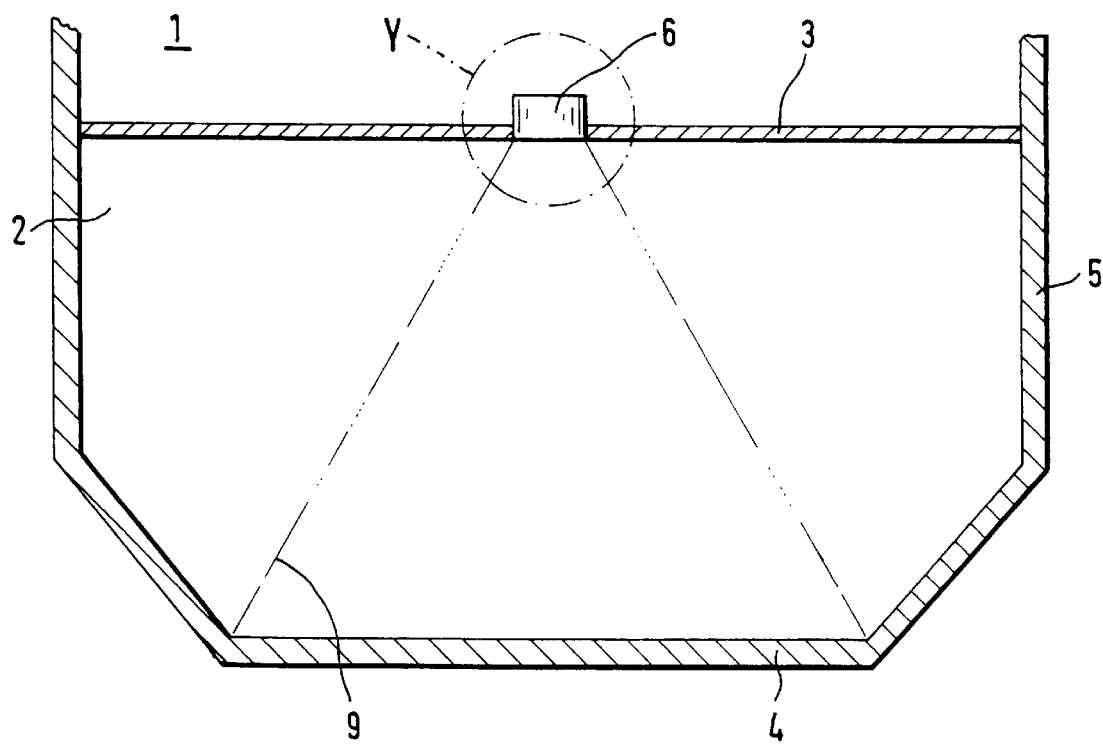
FIG. 3 is a sectional view showing the principle of a freight compartment with a conventional lighting system.

The way in which the freight compartment 2 is illuminated can be seen in particular in FIG. 1. The through openings 19 or the lighting units 6 are arranged in the freight compartment ceiling 3 in such a way that the light cones 9 of the lighting units 6 intersect or overlap in the freight compartment 2. By virtue of that configuration, virtually the entire freight compartment 2, in particular also in the edge regions, can be uniformly illuminated. In that respect, the degree of illumination depends on the one hand on the number and the density of the lighting units 6 in the freight compartment ceiling 3 and on the other hand on the respective aperture angle of the light cone 9. In comparison with the illumination effect shown in FIG. 1, the conventional lighting systems only made it possible to sufficiently brightly light a central region of the freight compartment 2, as shown in FIG. 3. In addition, with the structure according to the invention of the lighting arrangement, the required level of brightness is immediately available when switching on the ceiling light while in the case of the conventional lighting systems with fluorescent lamps 7, it was necessary to wait for a certain pre-heating and waiting time for the lamp, particularly at low temperatures.

The lighting elements 6 of the lighting system shown in FIG. 1 will now be described in greater detail by means of the portion indicated at X in FIG. 1 and shown on an enlarged scale in FIG. 2.

Figure 4:
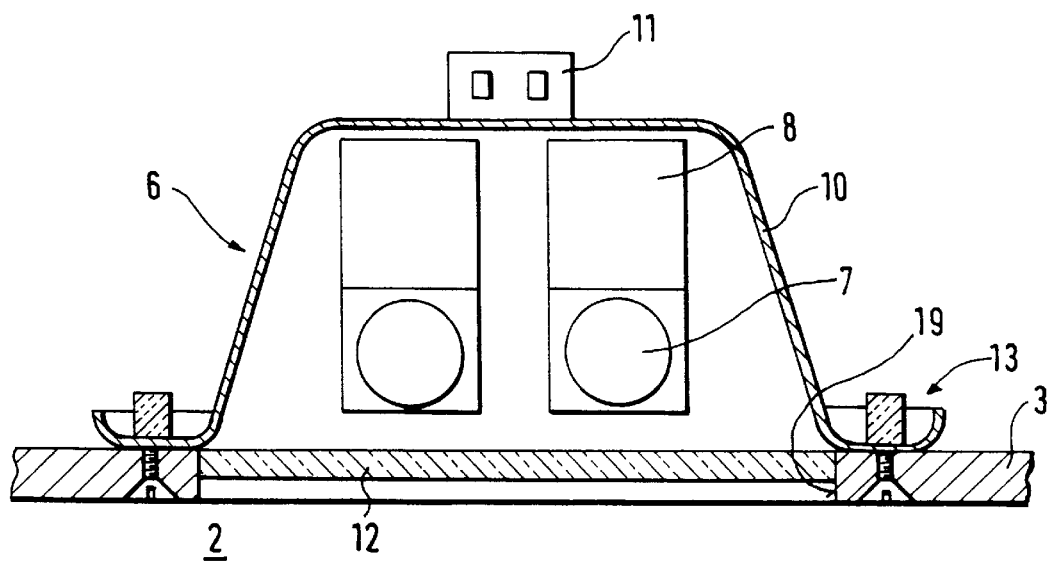
FIG. 4 shows a portion as indicated at Y in FIG. 3 of a conventional lighting unit on an enlarged scale.

The lighting element 6 essentially comprises a light coupling-out element 16 which is necessarily fire-resistant and which is fitted by means of a commercially available insert 17 which is also fire-resistant into an opening 19 in the freight compartment ceiling 3. In this case, the light coupling-out element 16 is of a diameter of only about 1 cm, and is therefore clearly smaller than the housing 10 of a conventional lighting element 6 which is shown in FIG. 4. The provision of the opening 19 or the insertion of the light coupling-out element 16 into the freight compartment ceiling 3 therefore has scarcely has any adverse effect on the static load-bearing capability of the freight compartment ceiling 3, and for that reason a large number of such openings 19 can be integrated into the freight compartment ceiling 3 without any problem.

An optical waveguide 14 which is connected to the central light source 15 is introduced into the light coupling-out element 16. The optical waveguide 14 couples out or emits the light into the freight compartment 3 through a suitable optical system 18 in per se known manner. In addition, a fire detector 20 or smoke detector 22 can be fitted into the element 16 in order to enhance the safety aspect.

Furthermore the use of optical waveguides or fibre optic lines 14 affords a higher level of safety in relation to fire, in comparison with lighting systems using fluorescent lamps 7. In addition it is technically easier for the relatively small coupling-out elements 16 to be made fire-resistant, than the comparatively very large lamp housings 10, 12 of the fluorescent lamps 8.

A further advantage of the lighting system according to the invention lies in its low weight and its low level of installation and maintenance cost.

Finally the invention affords a further advantage by virtue of the fact that the detector is disposed in the housing of the light source and not at the exit opening. For, by virtue of that arrangement, only one detector is required for the whole illuminated region—a second detector could be provided for the purposes of redundancy. The additional advantages are that the detector is disposed in the protected space and that no lines have to be laid.

List of References 1 passenger compartment
2 freight compartment
3 ceiling
4 floor
5 side wall
6 lighting unit
7 fluorescent lamp
8 light electronics
9 light cone
10 high-quality steel housing
11 plug housing
12 cover
13 fixing devices
14 optical waveguide
15 light source
16 light coupling-out element
17 insert
18 optical system
19 through opening

What is claimed is:

1. A lighting arrangement for a closeable freight compartment in a passenger aircraft having a passenger cabin located above said freight compartment; wherein a fire-proofing ceiling (3) of said freight compartment (2) concurrently forms a floor of said passenger cabin and constitutes a closure between said compartment and said cabin; said ceiling (3) having a plurality of through-openings (19) formed therein distributed in a grid-like matrix across the surface of said ceiling (3); a plurality of lighting units (6) each having a fire-resistant light coupling-out element (16); a fire-resistant insert (17) being fixedly arranged in each of said through-openings (19), each said insert (17) having respectively one said lighting unit (6) housing a light coupling-cut element (16) mounted therein such that light is discharged from said elements (160 in the shape of light cones (9) which intersect within said compartment (2) to produce a uniformly dispersed light throughout said compartment; and optical waveguides (14) connect each of said light coupling-out element (16) to at least one common light source (15).

2. A lighting arrangement as claimed in claim 1, wherein a fire detector (20) is integrated into at least one of said lighting units (6).

3. A lighting arrangement as claimed in claim 1, wherein a smoke detector (22) is integrated into at least one of said lighting units (6).

4. A lighting arrangement as claimed in claim 1, wherein light emitted into said freight compartment (2) from interlinked light coupling-out elements (16) attains a redundancy of intersecting light cones.

5. A lighting arrangement as claimed in claim 1, wherein said optical waveguides (14) comprises fiber optic cables.

* * * * *